United States Patent [19]

Good, Jr. et al.

[11] Patent Number: 5,019,275
[45] Date of Patent: May 28, 1991

[54] METHOD OF FLOCCULATION WITH CATIONIC TERPOLYMER FLOCCULANTS

[75] Inventors: Frederick J. Good, Jr., Camillus; Ronald E. Highsmith, Skaneateles, both of N.Y.

[73] Assignee: Polypure, Inc., Solvay, N.Y.

[21] Appl. No.: 567,908

[22] Filed: Aug. 15, 1990

Related U.S. Application Data

[62] Division of Ser. No. 337,909, Apr. 14, 1989, Pat. No. 4,981,936.

[51] Int. Cl.$^5$ .............................................. C02F 1/56
[52] U.S. Cl. .................................................. 210/734
[58] Field of Search ................................. 210/733, 734

[56] References Cited

U.S. PATENT DOCUMENTS 4,968,435 11/1990 Neff ...................................... 210/734

Primary Examiner—Christopher Henderson
Attorney, Agent, or Firm—Robert M. Phipps

[57] ABSTRACT

Water soluble terpolymers based on (1) an acrylamide or acrylamide derivative, (2) a cationic vinyl monomer and (3) a hydrophilic vinyl monomer of the formula $CH_2C(R)C(O)O(CH_2(CH_2)_mO)_nE$ where R and E are each hydrogen or alkyl, m is an integer from 1 to 3 and n is an integer from 1 to 25 are useful flocculants.

10 Claims, No Drawings

METHOD OF FLOCCULATION WITH CATIONIC TERPOLYMER FLOCCULANTS

This is a division of application Ser. No. 337,909, field Apr. 14, 1989, now U.S. Pat. No. 4,981,936.

BACKGROUND

1. Field of Invention

This invention relates to a water soluble terpolymer composition and its use as a flocculant. The terpolymers of this invention contain acrylamide or acrylamide derivatives, a cationic vinyl monomer, and the following general class of hydrophilic vinyl monomer:

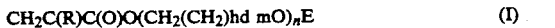

$$CH_2C(R)C(O)O(CH_2(CH_2)_{m}O)_{n}E \quad (I)$$

where R is hydrogen or alkyl, E is hydrogen or alkyl, m is an integer from 1 to 3, and n is an integer 1 to 25.

2. Description of the Prior Art

Copolymers of acrylamide and cationic vinyl monomers are well known and have long been used as flocculants for water and waste water treatment, mineral beneficiation, and pulp and paper processing. The general purpose of these flocculants is to aggregate suspensions of colloidal particles, resulting in improved settling or dewatering of the flocculated particles. For economic reasons, it is desirable to achieve the greatest amount of flocculation using the smallest flocculant dose. It is an object of this invention to provide terpolymers with surprising flocculation activity compared to conventional copolymer flocculants. Still other objects will be apparent to those skilled in the art upon reference to the following detailed description.

SUMMARY OF THE INVENTION

In accordance with this invention there is provided a terpolymer of the formula:

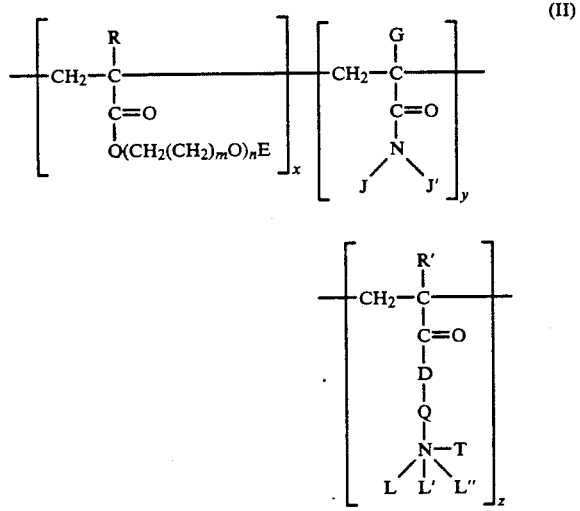

wherein

R and R' are independently selected from the group consisting of hydrogen and lower alkyl having from 1 to 6 carbon atoms;

D is selected from the group consisting of oxygen and NH;

E is selected from the group consisting of hydrogen and lower alkyl having from 1 to 6 carbon atoms;

G is selected from the group consisting of hydrogen and lower alkyl having from 1 to 6 carbon atoms;

J and J' are independently selected from the group consisting of hydrogen and lower alkyl having from 1 to 6 carbon atoms;

L, L' and L" are independently selected from the group consisting of hydrogen, alkyl containing 1 to 18 carbon atoms, hydroxyalkyl containing 1 to 18 carbon atoms Q is selected from the group consisting of alkyl containing from 1 to 6 carbon atoms and hydroxy alkyl containing from 1 to 6 carbon atoms;

T is an anion selected from the group consisting of bromide, chloride, fluoride, iodide, sulfate, alkyl sulfate of 1 to 4 carbon atoms, acetate, phosphate, citrate, tartrate, bicarbonate and mixtures thereof;

m is an integer from 1 to 3;

n is an integer from 1 to 25; and x, y and z are each a number from 0.01 to 0.99 and the sum of x, y and z is 1.

DETAILED DESCRIPTION OF THE INVENTION

The terpolymers of this invention, as described in formula II above, are water soluble and particularly useful as flocculants. As shown above, the terpolymer is composed of a hydrophilic vinyl monomer (the x component), and acrylamide or acrylamide derivative (the y component) and a cationic vinyl monomer (the z component).

As previously noted, each expression of R and R' in formula II is selected from the group of hydrogen and lower alkyl containing from 1 to 6 carbon atoms. More preferably, each expression will be either hydrogen or methyl.

The water solubility of the vinyl monomer, or x component, is maintained by selecting substitutents of R, E, m and n such that the vinyl monomer is water soluble. It is within the scope of this invention that the terpolymer may contain isomers of the same vinyl monomer or may be a mixture of vinyl monomers which are within the above definition of the x component. Preferably m will be an integer from 1 to 2 and n will be an integer from 1 to 5.

Specific examples of hydrophilic vinyl (i.e., x) monomers include hydroxyethyl methacrylate, hydroxyethyl acrylate, hydroxypropyl methacrylate, hydroxypropyl acrylate, methoxyethyl acrylate, methoxyethyl methacrylate, ethoxyethyl methacrylate, ethoxyethoxyethyl acrylate, and methoxy polyethylene glycol methacrylate (having from 2 to 25 ethylene glycol units).

In the acrylamide or acrylamide derivative portion (the y component) of the terpolymer of this invention G is preferably hydrogen or methyl and more preferably hydrogen. It is preferred that J and J' each be hydrogen. Preferably the y component monomer is also water soluble. As is the case with the x component above, the y component monomer may be a mixture of isomers and or monomers encompassed within the above definition of y component monomers. Examples of y component monomers include acrylamide and substituted acrylamides such as methacrylamide, N-methylacrylamide, and N,N-dimethylacrylamide.

In the cationic vinyl monomer (the z component) of the terpolymer, the expressions L, L' and L" are preferably methyl. The expression T represents an anion selected from the group consisting of bromide, chloride, fluoride, iodide, sulfate, alkyl sulfate of 1 to 4 carbon atoms, acetate, phosphate, citrate, tartrate, bicarbonate and mixtures thereof. More preferably T is selected from the group consisting of chloride and alkylsulfate of 1 to 4 carbon atoms, and chloride is still more preferred. Preferably the cationic vinyl monomer is also water soluble.

Examples of the cationic vinyl (i.e., z) monomers include vinyl esters of amino alcohols, their acid salts and their quaternization products, such as acryloyloxyethyldimethyl amine hydrochloride, acryloyloxyethyltrimethylammonium chloride, acryloyloxyethyldiethyl amine hydrochloride, methacryloyloxyethyldimethyl amine methyl sulfate, methacryloyloxyethyldimethyl amine hydrochloride, methacryloyloxyethyltrimethylammonium chloride, methacryloyloxyethyltrimethylammonium methylsulfate, methacryloyloxyethyldiethyl amine methyl sulfate, methacryloyloxyethyldiethyl amine hydrochloride and methacryloyloxyhydroxypropyltrimethylammonium chloride. Additional examples of z monomers include acrylamido derivatives such as acrylamidopropyldimethyl amine methyl sulfate, acrylamidopropyltrimethylammonium chloride, methacrylamidopropyldimethyl amine methyl sulfate, and methacrylamidopropyltrimethylammonium chloride.

The more preferred vinyl monomers are acryloyloxyethyltrimethylammonium chloride, methacryloyloxyethyltrimethylammonium chloride, methacryloyloxyhydroxypropyltrimethylammonium chloride, acrylamidopropyltrimethylammonium chloride, and methacrylamidopropyltrimethylammonium chloride. The still more preferred monomers of this group are acryloyloxyethyltrimethylammonium chloride and methacryloyloxyethyltrimethylammonium chloride.

The molar fraction of x, y and z monomers each independently vary from 0.01 to 0.99. The preferred range for each monomer component depends on the application for which the polymers of this invention will be used. Some potential applications for the invention include, but are not limited to, sludge thickening and dewatering, pulp and paper processing, and mineral beneficiation. For sludge dewatering applications, the preferred value for x is from 0.01 to 0.10. The preferred value for y is from 0.40 to 0.74 and the preferred value for z is from 0.25 to 0.50. In all cases the sum of x+y+z must equal 1.

The molecular weight of the terpolymer of formula II may range from 1000 to 50,000,000. The preferred molecular weight will depend upon the application, but generally molecular weights above 1,000,000 are preferred for most flocculation applications.

Polymers given by formula II may be prepared by well known conventional solution, suspension, and emulsion polymerization techniques, as taught by Vanderhoff, J. W. et al. in *Polymerization and Polycondensation Processes, Advances in Chemistry Series* 34,(1962) or *Water-Soluble Polymers, Polymers Science and Technology*, 2, N. M. Bikales (1973) at pages 213-242 and which for convenience, are incorporated herein by reference.

Solution polymerization techniques generally involve the following steps:
1. Preparation of a solution of monomers at the desired concentration. In the present invention, the solvent used is water.
2. Addition of additives such as chelants, buffers and molecular weight controlling agents.
3. De-oxygenating the solution, preferably with an inert gas such as argon, or more preferably nitrogen.
4. Subjecting the solution to free-radical forming conditions. This may be accomplished by the addition of a free-radical forming substance, exposure to heat, or exposure to radiation.

The reaction time and temperature are generally determined by the initiator, residual monomer requirements, and the desired polymer molecular weight.

In both suspension and emulsion polymerizations an aqueous solution of monomers is dispersed in a nonpolar liquid. The polymerization takes place in the dispersed droplets. The following general procedure may be used for both suspension and emulsion polymerization:
1. Combination of all aqueous phase ingredients such as monomers, water, chelants, buffers and molecular weight control agents into one vessel.
2. Combination of all oil phase ingredients such as surfactants and oil into another vessel.
3. Addition of the aqueous phase to the oil phase accompanied by mixing.
4. In the case of emulsions, the size of the dispersed water droplets may be reduced by high-shear mixing or homogenization.
5. De-oxygenation, preferably by purging the system with an inert gas such as argon or nitrogen
6. Subjecting the suspension or emulsion to free-radical forming conditions.
7. If desired, post-processing such as removal of water or the addition of finishing agents. Reaction time and temperature are generally determined by the initiator, residual monomer requirements and the desired polymer molecular weight.

The terpolymers of this invention are especially useful as flocculants. Flocculants are used to help coagulate suspended particles in water. They find application in sludge dewatering and clarification of waste water. They also find application in various industrial processes such as mineral beneficiation, paper making and other areas which are well known to those skilled in the art of the use of polymer flocculants.

In general, an aliquot of a dilute ( 0.1 to 0.2 percent) aqueous polymer (flocculant) solution is mixed with the suspended solids. The mixing is sufficient to uniformily distribute the polymer, but not so intense as to break up the flocs that may form. Polymer doses may range from about two to over 200 parts per million of polymer to the total matter being treated.

Several common laboratory tests and measurements such as the jar test, settling test, Buchner funnel test, capillary suction time and specific resistance to filtration may be used to measure performance. These test are considered in more detail in the text *Solid/Liquid Separation Equipment Scale-up* by D. B. Purchas, which for the sake of convenience is incorporated herein by reference. Generally it is desirable to have the highest level of performance (highest setting rate or smallest resistance to filtration) at the smallest polymer dose or charge to the matter being treated.

The following examples are illustrative only and should not be construed as limiting the invention. All parts and percents referred to herein are on a weight basis, all viscosities measured at 25° C. unless otherwise specified and all temperatures are degrees Celsius.

EXAMPLE 1

Preparation of acrylamide, acryloyloxyethyltrimethylammonium chloride and methoxyethyl acrylate terpolymer.

A 16 ounce square bottle, equipped with a nitrogen inlet, a nitrogen outlet and an initiator inlet, is charged with 16.6 grams of a 50% acrylamide solution, 30.3 grams of a 75% acryloyloxyethyltrimethylammonium chloride solution, 1.6 grams of methoxyethyl acrylate, 250 grams of deionized water, and three drops of pentasodium salt of diethylenetriaminepentaacetic acid (available from DOW Chemical Company under the trademark Versenex 80) chelant. The monomer solution is adjusted to a pH of 3.5 with 1 N hydrochloric acid and is then purged with nitrogen for one hour. The polymerization was initiated by adding 1.0 gram of a 5.0% solution of 2,2'-azobisdimethyleneisobutylamidine dihydrochloride (available from WAKO Pure Chemical Industries, Ltd. under the trademark WAKO VA-044) in deionized water. The nitrogen purge is continued for 24 hours.

Analysis of the resulting solution for residual monomers using high pressure liquid chromatography (HPLC) shows that greater than 99 percent of the charged monomers are incorporated into the resulting terpolymer.

The resulting polymer contains approximately 5 mole percent methoxyethyl acrylate, 50 mole percent acrylamide and 45 mole percent acryloyloxyethyltrimethylammonium chloride. The Brookfield viscosity of a 0.1% polymer solution of 1 N sodium nitrate at 25° C. is 3.6 centipoise. The molecular weight of the terpolymer is approximated from the Brookfield viscosity using the following equation molecular weight $=2.6 \times 10^6 (\text{viscosity}-1.0)$, where viscosity is expressed in centipoise, as 6.7 million.

The flocculation activity of the above polymer of this example is demonstrated in Example 6 below.

The example is repeated except that N-methylacrylamide is used instead of acrylamide. The resulting terpolymer is equally useful.

EXAMPLE 2

Preparation of acrylamide, acryloyloxyethyltrimethylammonium chloride and hydroxyethyl acrylate terpolymer.

Utilizing apparatus and procedure similar to that described in Example 1, 17.8 grams of a 50% acrylamide solution, 27.5 grams of a 75% acryloyloxyethyltrimethylammonium chloride solution, 0.8 grams of hydroxyethyl acrylate, 253 grams of deionized water, and three drops of pentasodium salt of diethylenetriaminepentaacetic acid are charged into a 16 ounce bottle. The monomer solution is adjusted to a pH of 3.5 with 1 N hydrochloric acid and then is purged with nitrogen for one hour. The polymerization is initiated by adding 1.0 gram of a 5.3% solution of 2,2'-azobisdimethyleneisobutylamidine dihydrochloride in deionized water. The nitrogen purge is continued for 24 hours.

The resulting polymer contains approximately 2 mole percent hydroxyethyl acrylate, 53 mole percent acrylamide and 45 mole percent acryloyloxyethyltrimethylammonium chloride. The molecular weight of the terpolymer, as determined by Brookfield viscosity using the equation given in Example 1, is 7.2 million.

The flocculation activity of the above polymer of this example is demonstrated in Example 6 below.

EXAMPLE 3

Preparation of acrylamide, methacryloyloxyethyltrimethylammonium chloride and methoxyethyl methacrylate terpolymer.

Utilizing apparatus and procedure similar to that described in Example 1, 16.9 grams of a 50% acrylamide solution, 28.0 grams of a 75% methacryloyloxyethyltrimethylammonium chloride solution, 0.7 grams of methoxyethyl methacrylate, 252 grams of deionized water, and nine drops of pentasodium salt of diethylenetriaminepentaacetic acid are charged into a 16 ounce bottle. The monomer solution is adjusted to a pH of 3.5 with 1 N hydrochloric acid and then is purged with nitrogen for one hour. The polymerization is initiated by adding 1.0 gram of a 5.1 % solution of 2,2'-azobisdimethyleneisobutylamidine dihydrochloride in deionized water. The nitrogen purge is continued for 24 hours.

The resulting polymer contains approximately 2 mole percent methoxyethyl methacrylate, 53 mole percent acrylamide and 45 mole percent methacryloyloxyethyltrimethylammonium chloride. The molecular weight of the terpolymer, as determined by Brookfield viscosity using the equation given in Example 1, is 3.4 million. Analysis of the resulting polymer using aqueous gel permeation chromatography (GPC) is consistent with a high molecular weight terpolymer.

The flocculation activity of the above polymer of this example is demonstrated in Example 6 below.

The example is repeated except that acrylamidopropyldimethyl amine methyl sulfate is used as the cationic vinyl monomer. The resulting terpolymer is equally useful for the purposes of this invention.

EXAMPLE 4

Preparation of acrylamide, methacryloyloxyethyltrimethylammonium chloride and methoxy pentaethylene glycol methacrylate terpolymer.

Utilizing apparatus and procedure similar to that described in Example 1, 16.5 grams of a 50°% acrylamide solution, 27.5 grams of a 75% methacryloyloxyethyltrimethylammonium chloride solution, 1.4 grams of methoxy pentaethylene glycol methacrylate, 253 grams of deionized water, and three drops of pentasodium salt of diethylenetriaminepentaacetic acid are charged into a 16 ounce bottle. The monomer solution is adjusted to a pH of 3.5 with 1 N hydrochloric acid and then is purged with nitrogen for one hour. The polymerization is initiated by adding 1.0 gram of a 4.9% solution of 2,2'-azobisdimethyleneisobutylamidine dihydrochloride in deionized water. The nitrogen purge is continued for 24 hours.

The resulting polymer contains approximately 2 mole percent methoxy pentaethylene glycol methacrylate, 53 mole percent acrylamide and 45 mole percent methacryloyloxyethyltrimethylammonium chloride. The terpolymer has an intrinsic viscosity of 5.4 decilitiers/gram at 30° C. in 1 N sodium nitrate which corresponds to a molecular weight of approximately 2.0 million.

The flocculation activity of the above polymer of this example is demonstrated in Example 6 below.

EXAMPLE 5

Preparation of acrylamide, methacryloyloxyethyltrimethylammonium chloride and methoxyethyl acrylate terpolymer.

The oil phase ingredients: 150 grams of hydrocarbon solvent (trademark Union 140 from Unocal Chemical Co.), 3.85 grams of ethoxylated lauryl alcohol (trademark Sipanic L7-80 from Alcolac Chemical Co.) and 13.65 grams of sorbitan monooleate (trademark Span 80 from ICI Americas, Inc.) are charged into a one liter vessel.

The aqueous phase components: 105.4 grams of a 50% acrylamide solution, 173.6 grams of a 75% methacryloyloxyethylammonium chloride solution, 3.7 grams of methoxyethyl acrylate, 25 grams of deionized water, 25 grams of glutaric acid and 0.055 gram of trisodium salt of N-(hydroxyethyl)-ethylenediaminetriacetic acid (trademark Versenol 120 from Dow Chemical Co.) are mixed in a separate vessel.

The aqueous phase is gradually added to the oil phase with mixing. High-shear mixing is then used to reduce the size of the dispersed water droplets.

The resulting monomer emulsion is transferred to a one liter, jacketed reactor equipped with a stirrer, a nitrogen inlet and an initiator inlet and then brought to the desired reaction temperature (40°-60° C.) and purged with nitrogen. Polymerization is initiated by the addition of 0.018 gram of 2,2′-azobis(2,4-dimethylvaleronitrile) (trademark Vazo 52 from E. I. duPont de Nemours & Co.). The reaction is completed in about 6 hours. Then 15.5 grams of ethoxylated nonylphenol (trademark Triton N-101 from Rohm & Haas) is added to the emulsion with stirring.

The resulting polymer contains approximately 2 mole percent methoxyethyl acrylate, 53 mole percent acrylamide and 45 mole percent methacryloyloxyethyltrimethylammonium chloride. The molecular weight of the polymer, as determined by Brookfield viscosity using the equation given in Example 1, is 4.6 million.

The flocculation activity of the above polymer of this example is demonstrated in Example 6 below.

EXAMPLE 6

The flocculation activity of the polymers prepared in Examples 1 through 5 are compared to a commercial flocculant which is a copolymer of acrylamide and methacryloyloxyethyltrimethylammonium chloride (commercially available from POLYPURE, INC. under the trademark Clarifloc C 310) using anaerobic digested sludge obtained from the Onondaga County Wastewater Treatment Plant located in Syracuse, N.Y.

Flocculation activity is determined using a specific filter resistance (SFR) test set out below. For additional information concerning this test see U.S. Pat. No. 4,668,747.

SFR TEST PROCEDURE

Prepare approximately 0.2% aqueous polymer solutions by mixing the concentrated polymer solution (Examples 1 through 4) or emulsion (Example 5) with water until the dilute polymer solution is homogeneous (approximately 24 hours for concentrated solutions such as Examples 1-4, and 0.5 hour for emulsions such as Example 5 and commercial flocculant which is a copolymer of acrylamide and methacryloyloxyethyltrimethylammonium chloride [trademark CLARIFLOC C-310 from Polypure, Inc.]).

Add an aliquot of the dilute polymer solution prepared above to a 300 milliliter aliquot of anaerobic digested sludge. Polymer doses to be used generally range from about 50 to 150 parts per million (ppm) of polymer.

Mix the polymer with the sludge by pouring the mixture back and forth from one mixing cup to another sixteen times.

Filter the flocculated sludge through a 40 mesh screen, 55 millimeters in diameter.

The filtrate volume is measured over time.

The specific filter resistance (SFR) is calculated using D'Arcy's law:

$$t/v = \mu W^\circ av/2\Delta P A^2$$

where:
t = time
v = volume of filtrate
W° = weight of solids per unit of filtrate
$\mu$ = absolute viscosity of suspension
$\Delta P$ = pressure drop across the sludge cake
A = cross sectional area of the sludge cake
a = specific filter resistance of the sludge cake The specific filter resistance (a) is determined by plotting t/v versus v and calculating the slope of the resulting line. All parameters other than (a) are easily determined by other techniques.

Varying the polymer dose yields a curve of specific filter resistance (SFR) versus polymer dose. Polymer performance is judged by the minimum polymer dose necessary to achieve a given SFR ($5 \times 10^5$ or $1 \times 10^6$ sec/g). The smaller the polymer dose for a given SFR, the better the polymer is performing.

Tables 1 and 2 below show a comparison of the results obtained in the above SFR test procedure using Clarifloc C310 and the terpolymers of this invention prepared in Examples 1 through 5 above.

TABLE 1

| POLYMER | SFR × 10⁻⁵ (sec/g) | POLYMER DOSE (ppm) | % REDUCTION IN DOSE |
|---|---|---|---|
| Clarifloc ® C310 | 5 | 138 | — |
| Example 1 | 5 | 113 | 18 |
| Example 2 | 5 | 80 | 42 |
| Example 5 | 5 | 104 | 25 |

TABLE 2

| POLYMER | SFR × 10⁻⁶ (sec/g) | POLYMER DOSE (ppm) | % REDUCTION IN DOSE |
|---|---|---|---|
| Clarifloc ® C310 | 1 | 113 | — |
| Example 3 | 1 | 74 | 35 |
| Example 4 | 1 | 107 | 5 |

The results demonstrate that the terpolymers disclosed in the invention are effective as flocculants for sludge dewatering, even when compared to commercially available copolymers.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property of privilege is claimed are defined as:

1. In the method of flocculating particles and or suspended matter in an aqueous media by the addition of a flocculating agent to the aqueous media the improvement which comprises adding an aqueous solution of a terpolymer to the water to be flocculated, said terpolymer being of the formula:

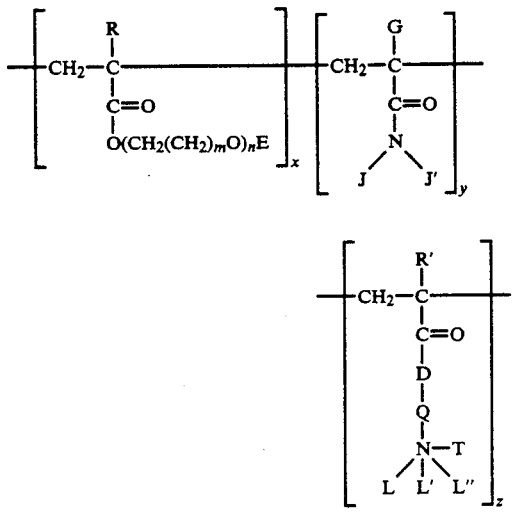

(II)

wherein

R is selected from the group consisting of hydrogen and methyl;

R' is selected from the group consisting of hydrogen and lower alkyl having from 1 to 6 carbon atoms;

D is selected from the group consisting of oxygen and NH;

E is selected from the group consisting of hydrogen and lower alkyl having from 1 to 6 carbon atoms;

G is selected from the group consisting of hydrogen and lower alkyl having from 1 to 6 carbon atoms;

J and J' are independently selected from the group consisting of hydrogen and lower alkyl having from 1 to 6 carbon atoms;

L, L' and L" are independently selected from the group consisting of hydrogen, alkyl containing 1 to 18 carbon atoms, hydroxyalkyl containing 1 to 18 carbon atoms and aryl;

Q is selected from the group consisting of alkyl containing from 1 to 6 carbon atoms and hydroxyalkyl containing from 1 to 6 carbon atoms;

T is an anion selected from the group consisting of chloride, alkyl sulfate of 1 to 4 carbon atoms and mixtures thereof;

m is an integer from 1 to 2;

n is an integer from 1 to 5;

x, y and z are each a number from 0.01 to 0.99 and the sum of x, y and z is 1; and said terpolymer having a molecular weight from 1,000,000 to 50,000,000.

2. The process of claim 1 wherein the monomer within the x expression is selected from the group of monomers consisting of hydroxyethyl methacrylate, hydroxyethyl acrylate, hydroxypropyl methacrylate, hydroxypropyl acrylate, ethoxyethoxyethyl acrylate and methoxyethyl acrylate.

3. The process of claim 1 wherein G is selected from the group consisting of hydrogen and methyl and J and J' are each hydrogen.

4. The process of claim 3 wherein the monomer within the y expression is acrylamide.

5. The process of claim 1 wherein R' is selected from the group consisting of hydrogen and methyl, and L, L' and L" are each methyl, T is chloride.

6. The terpolymer of claim 5 wherein the monomer within the z expression is selected from the group of monomers consisting of acryloyloxyethyltrimethylammonium chloride, methacryloyloxyethyltrimethylammonium chloride, methacryloyloxyhydroxypropyltrimethylammonium chloride, acrylamidopropyltrimethylammonium chloride, and methacrylamidopropyltrimethylammonium chloride.

7. The process of claim 1 wherein G, R and R' are independently selected from the group of monomers consisting of hydrogen and methyl; J and J' are each hydrogen; L, L' and L" are each methyl; T is chloride and n is an integer from 1 to 5.

8. The process of claim 7 wherein the monomer of the:

x expression is selected from the group of monomers consisting of hydroxyethyl methacrylate, hydroxyethyl acrylate, hydroxypropyl methacrylate, hydroxypropyl acrylate, ethoxyethoxyethyl acrylate and methoxyethyl acrylate;

y expression is selected from the group of monomers consisting of acrylamide and methacrylamide; and z expression is selected from the group of monomers consisting of acryloyloxyethyltrimethylammonium chloride, methacryloyloxyethyltrimethylammonium chloride, methacryloyloxyhydroxypropyltrimethylammonium chloride, acrylamidopropyltrimethylammonium chloride and methacrylamidopropyltrimethylammonium chloride.

9. The process of claim 8 wherein x is methoxyethyl acrylate, y is acrylamide and z is selected from the group of consisting of acryloyloxyethyltrimethylammonium chloride and methacryloyloxyethyltrimethylammonium chloride.

10. The process of claim 1 where the aqueous media is sludge and the flocculation of said suspended matter aids in sludge dewatering.

* * * * *

Disclaimer 5,019,275 — Frederick J. Good, Jr., Camillus; Ronald E. Highsmith, Skaneateles, both of N.Y. METHOD OF FLOCCULATION WITH CATIONIC TERPOLYMER FLOCCULANTS. Patent dated May 28, 1991. Disclaimer filed March 10, 1997, by the assignee, S.N.F.

Hereby enters this disclaimer to all claims of said patent.
*(Official Gazette,* April 29, 1997)